US009033252B2

(12) United States Patent
Ikeda

(10) Patent No.: US 9,033,252 B2
(45) Date of Patent: May 19, 2015

(54) COMMUNICATION MODULE, CONNECTOR, AND CONNECTOR-EQUIPPED COMMUNICATION MODULE

(71) Applicant: Murata Manufacturing Co., Ltd., Nagaokakyo-shi, Kyoto-fu (JP)

(72) Inventor: Naoto Ikeda, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 14/269,325

(22) Filed: May 5, 2014

(65) Prior Publication Data

US 2014/0239077 A1 Aug. 28, 2014

Related U.S. Application Data

(63) Continuation of application No. PCT/JP2012/078864, filed on Nov. 7, 2012.

(30) Foreign Application Priority Data

Nov. 9, 2011 (JP) ................................. 2011-245234

(51) Int. Cl.
*G06K 19/06* (2006.01)
*G06K 19/077* (2006.01)
(52) U.S. Cl.
CPC .... *G06K 19/07745* (2013.01); *G06K 19/07749* (2013.01)
(58) Field of Classification Search
CPC .......... G06K 7/0021; G06K 19/07749; G06K 19/0775
USPC ................................................ 235/441, 492
See application file for complete search history.

(56) References Cited

U.S. PATENT DOCUMENTS

| 2003/0111541 A1* | 6/2003 | Washino et al. ............... 235/492 |
| 2008/0257967 A1* | 10/2008 | Nishizawa et al. ........... 235/492 |
| 2009/0103260 A1* | 4/2009 | Tomioka .................. 361/679.56 |
| 2011/0309893 A1* | 12/2011 | Kawamura et al. ........... 333/104 |

FOREIGN PATENT DOCUMENTS

| JP | 2001-285119 A | 10/2001 |
| JP | 2009-146609 A | 7/2009 |
| JP | 2010-257640 A | 11/2010 |

OTHER PUBLICATIONS

Official Communication issued in International Patent Application No. PCT/JP2012/078864, mailed on Jan. 15, 2013.

* cited by examiner

*Primary Examiner* — Daniel St Cyr
(74) *Attorney, Agent, or Firm* — Keating & Bennett, LLP

(57) ABSTRACT

A connector-equipped communication module includes a communication module and a connector. The communication module includes a wiring board including antenna-mounted and IC-mounted regions at different positions in a planar view, an antenna element mounted in the antenna-mounted region, a wireless IC and a mounted component mounted in the IC-mounted region, and side terminals in the IC-mounted region and peripheral portions near the IC-mounted region. The connector includes a receiving portion including a placement portion configured to mount the communication module and a wall portion extending around the placement portion, inner wall terminals on an inner side of the wall portion at positions facing the side terminals, and external terminals located outward of the receiving portion and electrically connected to the inner wall terminals. In a state where the communication module is received in the receiving portion, the inner wall and side terminals are fitted so as to contact with each other.

16 Claims, 5 Drawing Sheets

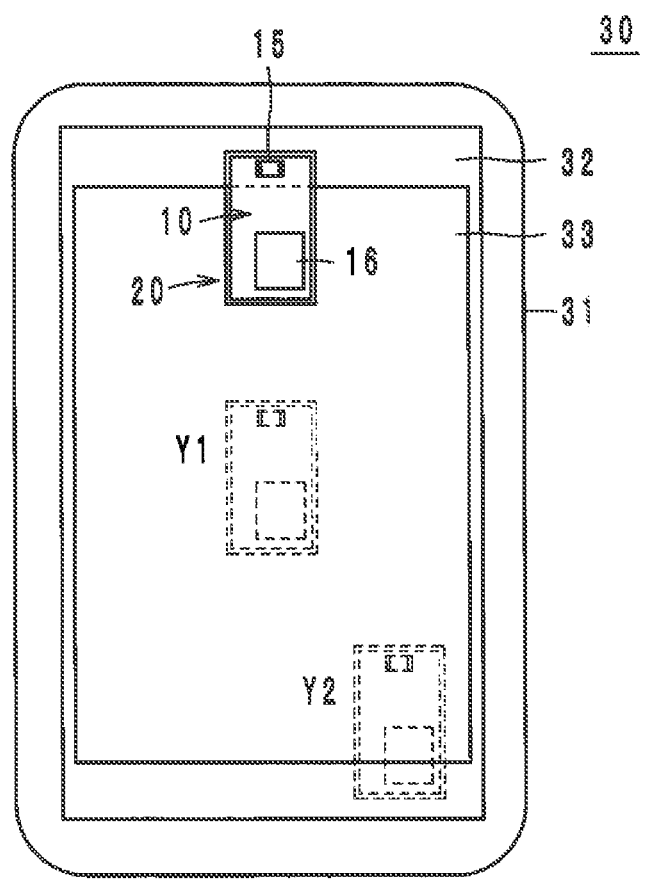

COMMUNICATION MODULE, CONNECTOR, AND CONNECTOR-EQUIPPED COMMUNICATION MODULE

BACKGROUND OF THE INVENTION

1. Field of the Invention

The present invention relates to a communication module, a connector, and a connector-equipped communication module, and particularly relates to a communication module which performs communication with high-frequency signals in various bands, a connector integrated with the communication module, and a connector-equipped communication module.

2. Description of the Related Art

In recent years, a communication apparatus that uses various frequency bands has been developed. In addition, an RFID (Radio Frequency Identification) system has been put into practical use as an article information management system, which includes a reader/writer that generates an induction field, and an RFID tag (also referred to as a wireless IC device) that is attached to an article, and non-contact communication using the induction field is established between the reader/writer and the RFID tag to transmit predetermined information therebetween.

In order to acquire certification of a communication standard as a communication module, it is impossible to use soldering with which a connection state is different for each product. Thus, it is necessary to mount a board of a communication module on a connector and to connect the communication module to a motherboard via the connector. In the related art, such a connector is generally of a slot type, and a card type communication module having a connection terminal formed at one end thereof is inserted therein. However, the slot type connector has a large thickness and thus is disadvantageous for height reduction.

Thus, as described in Japanese Unexamined Patent Application Publication No. 2010-257640, a connector has been proposed as a connector for a communication module provided with side terminals, which connector includes a placement surface and a side wall having an inner peripheral surface on which inner wall terminals for connecting to the side terminals of the communication module are provided.

However, in the connector described in Japanese Unexamined Patent Application Publication No. 2010-257640, since the terminals are formed on a side surface of the module, height reduction is possible, but the side terminals or the like adversely affects an antenna element provided to the communication module, thereby deteriorating the antenna characteristics.

SUMMARY OF THE INVENTION

Accordingly, preferred embodiments of the present invention provide a communication module, a connector, and a connector-equipped communication module which allow for height reduction and are able to prevent a connection terminal from adversely affecting an antenna element.

A connector-equipped communication module with a according to a first preferred embodiment of the present invention includes a communication module and a connector which receives the communication module, wherein the communication module includes a wiring board including an antenna-mounted region and an IC-mounted region at different positions in a planar view; an antenna element mounted in the antenna-mounted region; a wireless IC and a mounted component mounted in the IC-mounted region; and side terminals provided only in the IC-mounted region of the wiring board and a plurality of peripheral portions near the IC-mounted region, wherein the connector includes a receiving portion including a placement portion configured to mount the communication module thereon and a wall portion extending around the placement portion; inner wall terminals provided on an inner side of the wall portion and at positions facing the side terminals; and external terminals located on an outer side of the receiving portion and electrically connected to the inner wall terminals, and in a state where the communication module is received in the receiving portion, the inner wall terminals and the side terminals are fitted to each other so as to contact with each other.

A communication module according to a second preferred embodiment of the present invention includes a wiring board including an antenna-mounted region and an IC-mounted region at different positions in a planar view; an antenna element mounted in the antenna-mounted region; a wireless IC and a mounted component mounted in the IC-mounted region; and side terminals provided only in the IC-mounted region of the wiring board and a plurality of peripheral portions near the IC-mounted region.

A connector according to a third preferred embodiment of the present invention is a connector for a communication module, the connector including a wiring board including an antenna-mounted region and an IC-mounted region at different positions in a planar view; an antenna element mounted in the antenna-mounted region; a wireless IC and a mounted component mounted in the IC-mounted region; and side terminals provided only in the IC-mounted region of the wiring board and a plurality of peripheral portions near the IC-mounted region. The connector includes a receiving portion including a placement portion configured to mount the communication module thereon and a wall portion extending around the placement portion; inner wall terminals provided on an inner side of the wall portion and at positions facing the side terminals; and external terminals located on an outer side of the receiving portion and electrically connected to the inner wall terminals.

Since the side terminals are provided to the communication module and the inner wall terminals which are fitted to the side terminals so as to contact with the side terminals are provided to the connector, it is possible to reduce the height of the connector. In addition, since the side terminals are provided only in the IC-mounted region of the wiring board of the communication module and a plurality of peripheral portions near the IC-mounted region and are not provided in the antenna-mounted region, the side terminals are prevented from adversely affecting the characteristics of the antenna element.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 6 is an explanatory diagram showing a state where a connector-equipped communication module is incorporated into a communication apparatus.

DETAILED DESCRIPTION OF THE PREFERRED EMBODIMENTS

Hereinafter, preferred embodiments of a communication module, a connector, and a connector-equipped communication module according to the present invention will be described with reference to the accompanying drawings. It should be noted that in each drawing, the common components or portions are designated by the same reference sings and the overlap description is omitted.

Figure 1A:
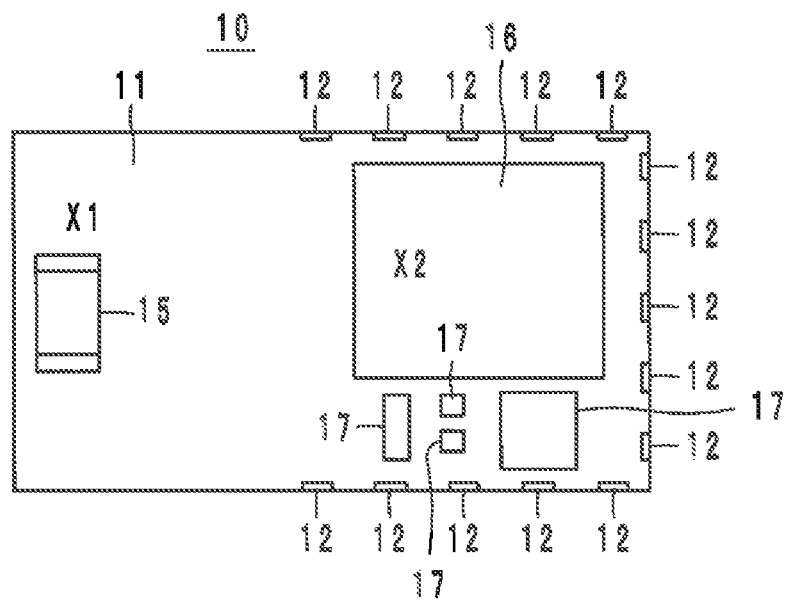
FIG. 1A is a plan view of a communication module according to a preferred embodiment of the present invention.
Figure 1B:
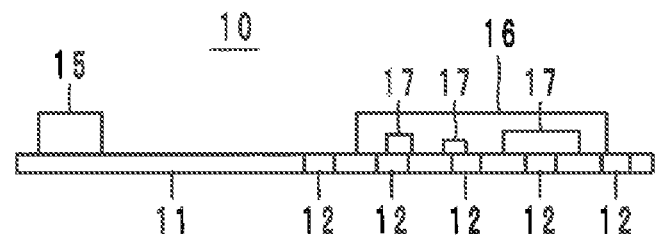
FIG. 1B is a front view of the communication module.

As shown in FIGS. 1A and 1B, a communication module 10 which is a preferred embodiment includes a wiring board 11, an antenna element 15, a wireless IC 16, and mounted components 17 such a capacitor element and a matching circuit element. The wiring board 11 preferably has a rectangular or substantially rectangular shape in a planar view, an antenna-mounted region X1 configured to mount the antenna element 15 is provided at the left side of FIG. 1A, and an IC-mounted region X2 configured to mount the wireless IC 16 and the mounted components 17 is provided at the right side of FIG. 1A.

The antenna element 15 preferably is of a chip type and is electrically connected to the wireless IC 16 via a conductor (not shown) provided on the surface of the wiring board 11 or within the wiring board 11. The wireless IC 16 preferably is a known one which processes an RF signal, and transmits/receives signals in a predetermined frequency band to/from an external transmitting/receiving apparatus via the antenna element 15. It should be noted that in the present preferred embodiment, the chip type is preferably used as the antenna element 15, but a wire provided on the wiring board 11 may be made into an antenna, or a ferrite antenna may be used.

Furthermore, side terminals 12 are provided at the peripheral portion of the wiring board 11. The side terminals 12 are connected to the wireless IC 16, the mounted components 17, and the like via conductors on the surface of the wiring board 11 or within the wiring board 11, and are used to connect to a motherboard of a communication apparatus via a connector 20 described later. The side terminals 12 are provided only in the IC-mounted region X2 of the wiring board 11 and the vicinity thereof, and are not provided in the antenna-mounted region X1. Specifically, when the wiring board 11 is produced by a multi-product manufacturing method, the side terminals 12 are provided so as to be exposed on the side surfaces of the wiring board 11 by loading a conductive material into holes formed in a motherboard and cutting the motherboard along the holes.

Figure 2A:
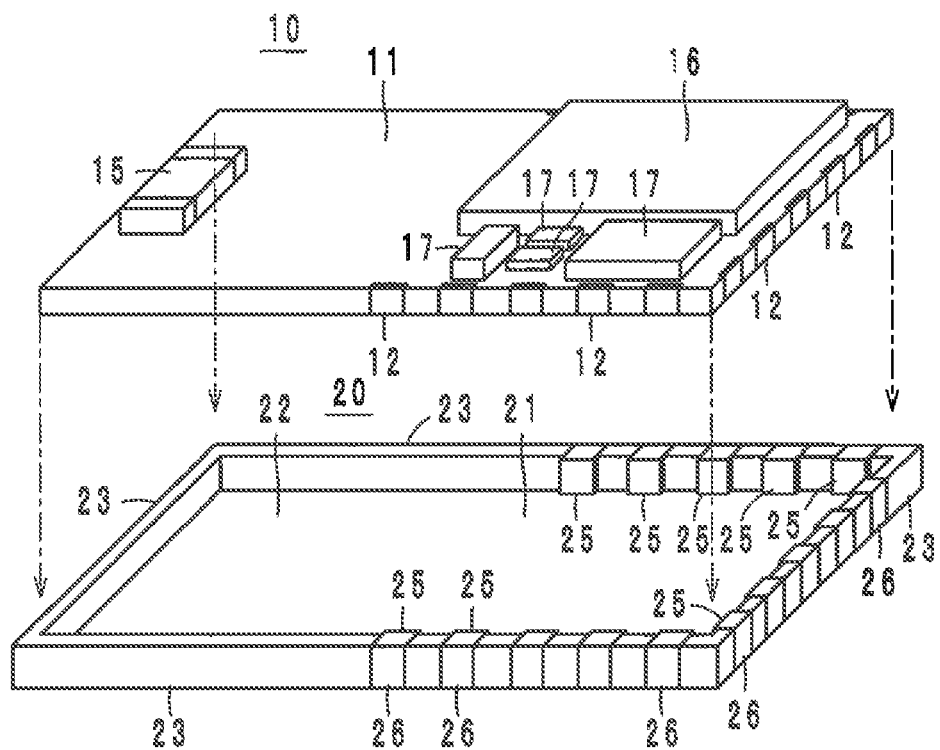
FIG. 2A is a perspective view showing a state before the communication module and a connector according to a preferred embodiment of the present invention are assembled.

The connector 20 is used to receive the communication module 10 and mounting the communication module 10 on a motherboard of a communication apparatus. As shown in FIG. 2A, the connector includes a receiving portion 21 which includes a placement portion 22 configured to mount the communication module 10 thereon, and a wall portion 23 extending around the placement portion 22. Furthermore, inner wall terminals 25 are provided on the inner side of the receiving portion 21 and at positions facing the side terminals 12, and external terminals 26 are provided on the outer side of the receiving portion 21 and electrically connected to the inner wall terminals 25. The inner wall terminals 25 and the external terminals 26 are provided by a method such as applying a conductive paste from the inner side of the receiving portion 21 of the connector 20 via an upper surface thereof to the outer side thereof.

Figure 4:
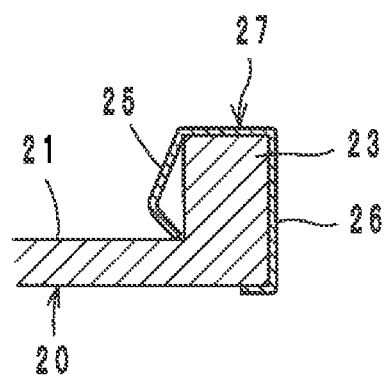
FIG. 4 is a cross-sectional view showing another example of a terminal provided to the connector.

In the present preferred embodiment, the inner wall terminals 25 and the external terminals 26 are provided by applying the conductive paste, but the inner wall terminals 25 and the external terminals 26 may be provided as metal fittings 27 (see FIG. 4) provided so as to extend from the inner side of the receiving portion 21 via the upper surface of the wall portion 23 to the outer side of the receiving portion 21.

Figure 2B:
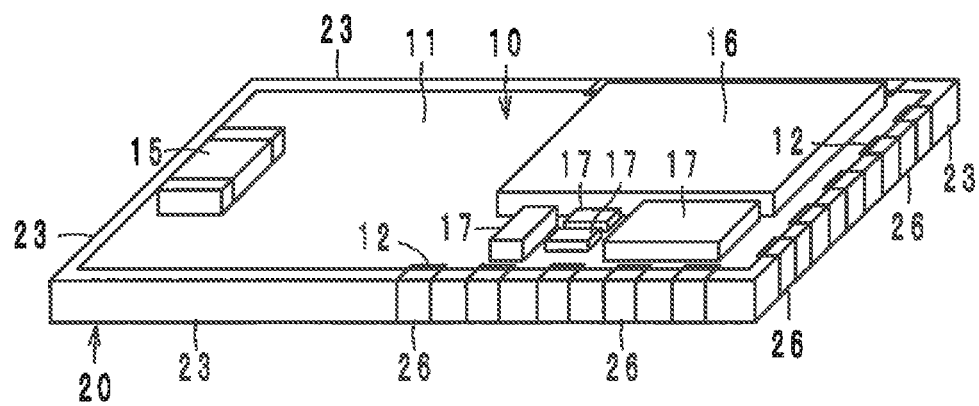
FIG. 2B is a perspective view showing a state where the communication module and the connector are assembled.

The communication module 10 is fitted to the receiving portion 21 of the connector 20, and this state is shown in FIG. 2B. At that time, the inner wall terminals 25 and the side terminals 12 are brought into contact with each other, and the side terminals 12 and the external terminals 26 are electrically conducted to each other. In other words, the wireless IC 16 and the like mounted in the communication module 10 are electrically connected to the external terminals 26 via the side terminals 12 and the inner wall terminals 25, and the external terminals 26 are connected to lands on the motherboard of the communication apparatus preferably by soldering or the like, for example.

Since the side terminals 12 are provided to the communication module 10 and the inner wall terminals 25 which are fitted to the side terminals 12 so as to contact with the side terminals 12 are provided to the connector 20 as described above, the height of the connector 20 is not higher than necessary. In addition, since the side terminals 12 are provided only in the IC-mounted region X2 of the wiring board 11 of the communication module 10 and the vicinity of the region X2 and are not provided in the antenna-mounted region X1, the side terminals 12 are prevented from adversely affecting the characteristics of the antenna element 15.

Figure 3A:
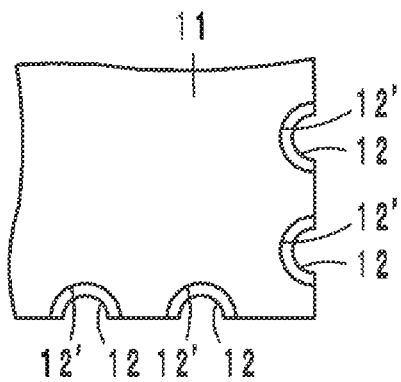
FIG. 3A is an explanatory diagram showing side terminals in an enlarged manner.
Figure 3B:
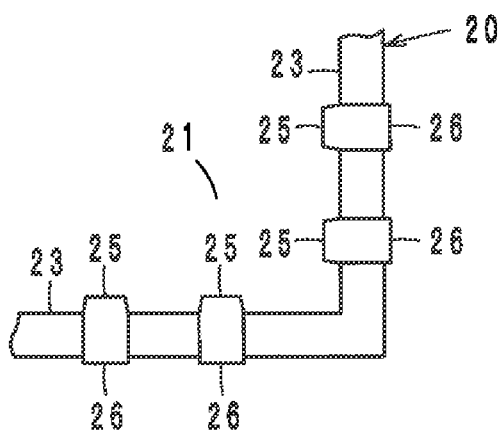
FIG. 3B is an explanatory diagram showing inner wall terminals and external terminals in an enlarged manner.
Figure 3C:
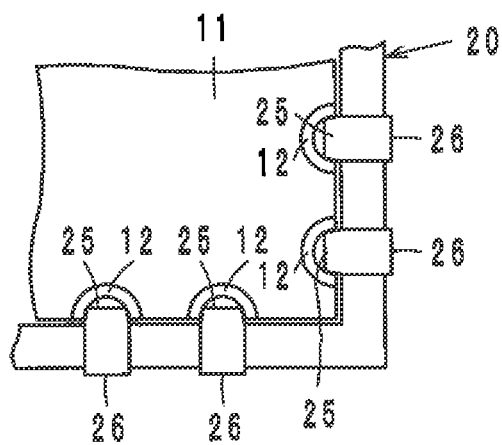
FIG. 3C is an explanatory diagram showing a state where the terminals are fitted to each other.

Here, a preferred configuration of the side terminals 12 and the inner wall terminals 25 will be described with reference to FIGS. 3A to 3C. As shown in FIG. 3A, the side terminals 12 preferably have a recess shape by applying the conductive material to wall surfaces of recesses 12' located on the side surfaces of the wiring board 11. As shown in FIG. 3B, the inner wall terminals 25 preferably have a projection shape slightly tapered at the inner side of the receiving portion 21 of the connector 20. When the communication module 10 is mounted in the receiving portion 21 of the connector 20, the inner wall terminals 25 and the side terminals 12 are fitted to each other as shown in FIG. 3C. In this manner, electrical conduction is achieved and accuracy of positioning of the wiring board 11 and the connector 20 is increased.

Figure 5:
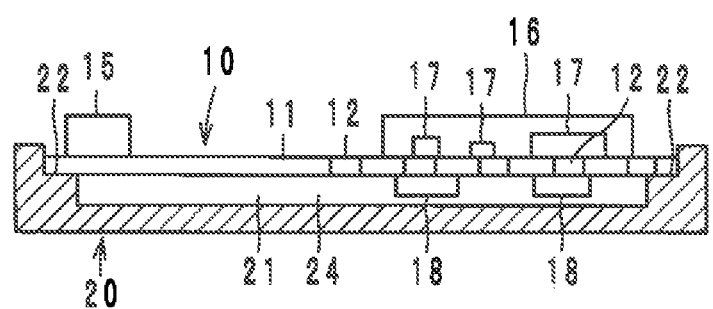
FIG. 5 is a cross-sectional view showing a state where a connector and a communication module according to another preferred embodiment of the present invention are assembled.

In addition, as shown in FIG. 5, the connector 20 may include a stepped placement portion 22 configured to mount the communication module 10 thereon, and a gap 24 may be formed between the back side of the wiring board 11 and the bottom of the receiving portion 21. When mounted components 18 are mounted at the back side of the wiring board 11, the gap 24 is required.

The communication module 10 including the connector 20 is mounted on a motherboard 32 of a communication apparatus (e.g., a cellular phone 30) as shown in FIG. 6. A ground conductor 33 is provided on a surface of the motherboard 32, and the motherboard 32 is received in a housing 31 of the cellular phone 30. The communication module 10 is mounted such that the external terminals 26 of the connector 20 are soldered to a land (not shown) or the ground conductor 33 on the motherboard 32. In mounting the communication module 10, the communication module 10 is preferably located at an end portion of the housing 31 as much as possible so that the communication 10 is able to exert communication performance of the antenna element 15 with an external device. In addition, in order to achieve the same purpose, it is also preferred that the ground conductor 33 provided on the motherboard 32 or another conductor is not close to the vicinity of the antenna element 15. In other words, it is preferable to avoid the communication module 10 being mounted at a center position Y1 of the motherboard 32 in FIG. 6, or at such a position Y2 that the antenna element 15 is located on the ground conductor 33 in FIG. 6.

In addition, since the external terminals 26 of the connector 20 are provided only in the vicinity of the IC-mounted region X2 in order to avoid an effect on the antenna element 15, the connector 20 is allowed to be fixed to the motherboard 32 only in the IC-mounted region X2. However, when a fitting projection formed from a non-conductive material is provided on a lower surface of the connector 20 corresponding to the antenna-mounted region X1 and is engaged with a notch or a fitting hole provided on the motherboard 32 side, it is possible to increase stability and accuracy of the mounted position of the connector 20 without affecting the antenna element 15.

Other Preferred Embodiments

It should be noted that the communication module, the connector, and the connector-equipped communication module according to the present invention are not limited to the above-described preferred embodiments, and may be variously modified within the scope of the present invention.

In particular, the detailed structures and shapes of the wiring board and the connector are arbitrary and can be modified as desired. In addition, the communication module may be mounted on various communication apparatuses other than a cellular phone.

As described above, preferred embodiments of the present invention are useful for a communication module and in particular, have a reduced height and are excellent in that it is possible to prevent a connection terminal from adversely affecting the antenna element.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A connector-equipped communication module comprising:
   a communication module; and
   a connector configured to receive the communication module; wherein
   the communication module includes:
      a wiring board including an antenna-mounted region and an IC-mounted region at different positions in a planar view;
      an antenna element mounted in the antenna-mounted region;
      a wireless IC and a mounted component mounted in the IC-mounted region; and
      side terminals provided only on a peripheral portion of the wiring board and around the IC-mounted region of the wiring board;
   the wiring board has a rectangular or substantially rectangular shape in the planar view;
   the antenna-mounted region is located at one end side of the wiring board in a long-side direction of the wiring board;
   the IC-mounted region is located at another end side of the wiring board in the long-side direction opposite to the one end side of the wiring board; and
   the side terminals are provided on a side surface at the another end side of the wiring board and two side surfaces which are adjacent to the side surface and extend in the long-side direction;
   the connector includes:
      a receiving portion including a placement portion configured to mount the communication module thereon and a wall portion extending around the placement portion;
      inner wall terminals provided on an inner side of the wall portion and at positions facing the side terminals; and
      external terminals located on an outer side of the receiving portion and electrically connected to the inner wall terminals; and
   in a state in which the communication module is received in the receiving portion, the inner wall terminals and the side terminals are fitted to each other so as to contact with each other.

2. The connector-equipped communication module according to claim 1, wherein the antenna element is one of a chip component, a wire provided on the wiring board, and a ferrite antenna.

3. The connector-equipped communication module according to claim 1, wherein the side terminals are exposed on side surfaces of the wiring board.

4. The connector-equipped communication module according to claim 1, wherein the inner wall terminals and the external terminals include at least one of conductive paste and metal fittings.

5. The connector-equipped communication module according to claim 1, wherein the side terminals have a recess shape and inner wall terminals have a projection shape.

6. The connector-equipped communication module according to claim 1, wherein the placement portion has a stepped configuration such that a gap is defined between a back of the wiring board and a bottom of the receiving portion.

7. A communication module used with a connector, the communication module comprising:
   a wiring board including an antenna-mounted region and an IC-mounted region at different positions in a planar view;
   an antenna element mounted in the antenna-mounted region;
   a wireless IC and a mounted component mounted in the IC-mounted region; and
   side terminals provided only on a peripheral portion of the wiring board and around the IC-mounted region of the wiring board; wherein
   the wiring board has a rectangular or substantially rectangular shape in the planar view;
   the antenna-mounted region is located at one end side of the wiring board in a long-side direction of the wiring board;
   the IC-mounted region is located at another end side of the wiring board in the long-side direction opposite to the one end side of the wiring board; and the side terminals are provided on a side surface at the another end side of the wiring board and two side surfaces which are adjacent to the side surface and extend in the long-side direction;

the connector includes:
- a receiving portion including a placement portion configured to mount the communication module thereon and a wall portion extending around the placement portion;
- inner wall terminals provided on an inner side of the wall portion and at positions facing the side terminals; and
- external terminals located on an outer side of the receiving portion and electrically connected to the inner wall terminals; and
- in a state in which the communication module is received in the receiving portion, the inner wall terminals and the side terminals are fitted to each other so as to contact with each other.

8. The communication module according to claim 7, wherein the antenna element is one of a chip component, a wire provided on the wiring board, and a ferrite antenna.

9. The communication module according to claim 7, wherein the side terminals are exposed on side surfaces of the wiring board.

10. The communication module according to claim 7, wherein the side terminals have a recess shape.

11. A connector for a communication module including: a wiring board including an antenna-mounted region and an IC-mounted region at different positions in a planar view; an antenna element mounted in the antenna-mounted region; a wireless IC and a mounted component mounted in the IC-mounted region; and side terminals provided only on a peripheral portion of the wiring board in the IC-mounted region and around the wiring board; wherein the wiring board has a rectangular or substantially rectangular shape in the planar view; the antenna-mounted region is located at one end side of the wiring board in a long-side direction of the wiring board; the IC-mounted region is located at another end side of the wiring board in the long-side direction opposite to the one end side of the wiring board; and the side terminals are provided on a side surface at the another end side of the wiring board and two side surfaces which are adjacent to the side surface and extend in the long-side direction;

the connector comprising:
- a receiving portion including a placement portion configured to mount the communication module thereon and a wall portion extending around the placement portion;
- inner wall terminals provided on an inner side of the wall portion and at positions facing the side terminals; and
- external terminals located on an outer side of the receiving portion and electrically connected to the inner wall terminals; wherein
- in a state in which the communication module is received in the receiving portion, the inner wall terminals and the side terminals are fitted to each other so as to contact with each other.

12. The connector according to claim 11, wherein the antenna element is one of a chip component, a wire provided on the wiring board, and a ferrite antenna.

13. The connector according to claim 11, wherein the side terminals are exposed on side surfaces of the wiring board.

14. The connector according to claim 11, wherein the inner wall terminals and the external terminals include at least one of conductive paste and metal fittings.

15. The connector according to claim 11, wherein the side terminals have a recess shape and inner wall terminals have a projection shape.

16. The connector according to claim 11, wherein the placement portion has a stepped configuration such that a gap is defined between a back of the wiring board and a bottom of the receiving portion.

* * * * *